W. G. HULL
Box-Loop for Harness.

No. 203,273. Patented May 7, 1878.

Witnesses
Chas. H. Smith
Harold Serrell

Inventor
William G. Hull
per Lemuel W. Serrell
Atty

UNITED STATES PATENT OFFICE.

WILLIAM G. HULL, OF SING SING, NEW YORK.

IMPROVEMENT IN BOX-LOOPS FOR HARNESS.

Specification forming part of Letters Patent No. 203,273, dated May 7, 1878; application filed August 13, 1877.

*To all whom it may concern:*

Be it known that I, WILLIAM G. HULL, of Sing Sing, in the State of New York, have invented an Improvement in Box-Loops for Harness, &c., of which the following is a specification:

My improvement relates to a box-loop having a row or rows of holes punched in the top surface of the loop, so that easy access is given to the tools and material that will be used in securing said loop in its proper position in harness or other work where box-loops are needed or used, and at the same time ventilating the loop, so that the leather of the strap or tug is not liable to damage or injury from dampness that would be retained a long time in a box-loop with no holes or openings left for the passage of air and moisture.

Figure 1:
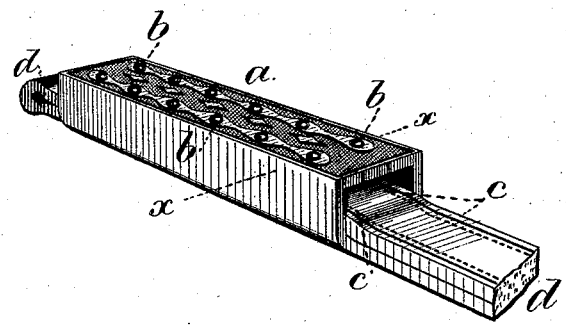
Figure 2:
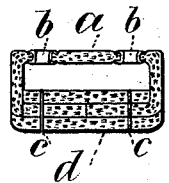

In the drawings, Figure 1 is a perspective view of the box-loop with holes, and Fig. 2 is a section transversely at the line $x\ x$.

The loop $a$ is perforated with the row or rows of holes $b$. This is done by proper dies or punches, and this may be done before or after the material for loop is put into the box shape.

When the box $a$ is sewed or secured to the strap $d$ the threads or wires are passed back and forth through the holes $b$, so that the line of stitches or fastenings $c\ c$ may be made in a neat and expeditious manner.

The edges of the holes may be lined or ornamented with a metallic lining similar to that used to line terrets and rings for harness trimmings. This lining is available for ornamentation, and it is useful in strengthening and preventing the fraying or roughening of the leather at the edges of the holes while the loop is being sewed or secured to its place.

I claim as my invention—

The box-loop for harness provided with a row or rows of holes through the outer part thereof, in line, or nearly so, with the stitches or other attaching devices at the back of the box, substantially as shown and described, and for the purpose specified.

Signed by me this 19th day of July, A. D. 1877.

W. G. HULL.

Witnesses:
C. B. PALMER,
SAMUEL A. TITLAR.